US008832016B2

(12) United States Patent
Ledlie

(10) Patent No.: US 8,832,016 B2
(45) Date of Patent: Sep. 9, 2014

(54) METHOD AND APPARATUS FOR PRIVATE COLLABORATIVE FILTERING

(75) Inventor: Jonathan Ledlie, Cambridge, MA (US)

(73) Assignee: Nokia Corporation, Espoo (FI)

(*) Notice: Subject to any disclaimer, the term of this patent is extended or adjusted under 35 U.S.C. 154(b) by 232 days.

(21) Appl. No.: 13/315,801

(22) Filed: Dec. 9, 2011

(65) Prior Publication Data
US 2013/0151462 A1 Jun. 13, 2013

(51) Int. Cl.
G06F 17/30 (2006.01)
G06Q 50/00 (2012.01)

(52) U.S. Cl.
USPC .................. 706/54; 707/602; 705/64; 705/74

(58) Field of Classification Search
USPC .......................................................... 706/54
See application file for complete search history.

(56) References Cited

U.S. PATENT DOCUMENTS

| | | |
|---|---|---|
| 7,072,886 B2 | 7/2006 | Salmenkaita et al. |
| 2001/0021914 A1 | 9/2001 | Jacobi et al. |
| 2002/0002897 A1 | 1/2002 | Pachet et al. |
| 2005/0038819 A1 | 2/2005 | Hicken et al. |
| 2008/0270417 A1 | 10/2008 | Roker |
| 2009/0063537 A1 | 3/2009 | Bonnefoy-Cudraz et al. |
| 2010/0011020 A1 | 1/2010 | Bouzid et al. |
| 2012/0209709 A1 | 8/2012 | Ramer et al. |

FOREIGN PATENT DOCUMENTS

| | | |
|---|---|---|
| WO | WO 00/30010 | 5/2000 |
| WO | WO 01/37193 A1 | 5/2001 |

OTHER PUBLICATIONS

Nandi et al., P3: A Privacy Preserving Personalization Middleware for recommendation-based services, 4th Hot Topics in Privacy Enhancing Technologies (HotPETs) Selected papers Waterloo [online], Canada Jul. 29, 2011 [retrieved on Sep. 9, 2013]. Retrieved from the Internet<URL:http://petsymposium.org/2011/papers/HotPETs11SelectedPapers.pdf>.*
N. Lathia et al., "Private Distributed Collaborative Filtering Using Estimated Concordance Measures", Oct. 2007, Minneapolis, Minnesota, pp. 1-8.
Polat et al., "Privacy-Preserving Collaborative Filtering Using Randomized Perturbation Techniques" (2003). Electrical Engineering and Computer Science. Paper 18. pp. 1-15 http://surface.syr.edu/eecs/18.
J. Canny, "Collaborative Filtering with Privacy", pp. 1-13, Computer Science Division, U.C. Berkeley, CA 94720, < http://www.cs.berkeley.edu/~jfc/'mender/IEEESP02.pdf >.

* cited by examiner

Primary Examiner — Jeffrey A. Gaffin
Assistant Examiner — Nathan Brown, Jr.
(74) Attorney, Agent, or Firm — Ditthavong & Steiner, P.C.

(57) ABSTRACT

An approach is provided for providing recommendation services while protecting the privacy of personal user information. The approach involves determining a request for at least one recommendation, the request specifying at least in part an anonymized user preference record. The approach also involves causing, at least in part, a comparison of the anonymized user preference record against one or more previously stored anonymized user preference records. The approach further involves causing, at least in part, a selection of the anonymized user preference record, the one or more previously stored anonymized user preference records, or a combination thereof based, at least in part, on the comparison. The approach additionally involves determining to generate the at least one recommendation based, at least in part, on the selection.

18 Claims, 12 Drawing Sheets

FIG. 4

Actual (Prior) User Preferences

| User ID (e.g. Day) | Item ID (e.g. code) | Count |
|---|---|---|
| 0 | 123 | 12 |
| 0 | 456 | 7 |
| 0 | 789 | 3 |
| 1 | 123 | 60 |
| 1 | 246 | 15 |
| ... | ... | ... |
| 13 | 246 | 120 |
| 13 | 555 | 30 |

Flag: first time? (Boolean)

401

METHOD AND APPARATUS FOR PRIVATE COLLABORATIVE FILTERING

BACKGROUND

Service providers and device manufacturers (e.g., wireless, cellular, etc.) are continually challenged to deliver value and convenience to consumers by, for example, providing compelling network services. One area of interest involves recommendation systems that provide users with certain recommendation information that is relevant to their particular interests. Conventional recommendation systems rely on information that is personal to the user that may be susceptible to theft and misappropriation. Accordingly, service providers and device manufacturers are continually challenged with providing recommendation services to users while protecting user privacy.

SOME EXAMPLE EMBODIMENTS

Therefore, there is a need for an approach for providing recommendation services while protecting the privacy of personal user information.

According to one embodiment, a method comprises determining a request for at least one recommendation, the request specifying at least in part an anonymized user preference record. The method also comprises causing, at least in part, a comparison of the anonymized user preference record against one or more previously stored anonymized user preference records. The method further comprises causing, at least in part, a selection of the anonymized user preference record, the one or more previously stored anonymized user preference records, or a combination thereof based, at least in part, on the comparison. The method additionally comprises determining to generate the at least one recommendation based, at least in part, on the selection.

According to another embodiment, an apparatus comprises at least one processor, and at least one memory including computer program code for one or more computer programs, the at least one memory and the computer program code configured to, with the at least one processor, cause, at least in part, the apparatus to determine a request for at least one recommendation, the request specifying at least in part an anonymized user preference record. The apparatus is also caused to cause, at least in part, a comparison of the anonymized user preference record against one or more previously stored anonymized user preference records. The apparatus is further caused to cause, at least in part, a selection of the anonymized user preference record, the one or more previously stored anonymized user preference records, or a combination thereof based, at least in part, on the comparison. The apparatus is additionally caused to determine to generate the at least one recommendation based, at least in part, on the selection.

According to another embodiment, a computer-readable storage medium carries one or more sequences of one or more instructions which, when executed by one or more processors, cause, at least in part, an apparatus to determine a request for at least one recommendation, the request specifying at least in part an anonymized user preference record. The apparatus is also caused to cause, at least in part, a comparison of the anonymized user preference record against one or more previously stored anonymized user preference records. The apparatus is further caused to cause, at least in part, a selection of the anonymized user preference record, the one or more previously stored anonymized user preference records, or a combination thereof based, at least in part, on the comparison. The apparatus is additionally caused to determine to generate the at least one recommendation based, at least in part, on the selection.

According to another embodiment, an apparatus comprises means for determining a request for at least one recommendation, the request specifying at least in part an anonymized user preference record. The apparatus also comprises means for causing, at least in part, a comparison of the anonymized user preference record against one or more previously stored anonymized user preference records. The apparatus further comprises means for causing, at least in part, a selection of the anonymized user preference record, the one or more previously stored anonymized user preference records, or a combination thereof based, at least in part, on the comparison. The apparatus further comprises means for determining to generate the at least one recommendation based, at least in part, on the selection.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram of a table illustrating user preferences, according to one example embodiment;

DESCRIPTION OF SOME EMBODIMENTS

Examples of a method, apparatus, and computer program for providing recommendation services while protecting the privacy of personal user information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
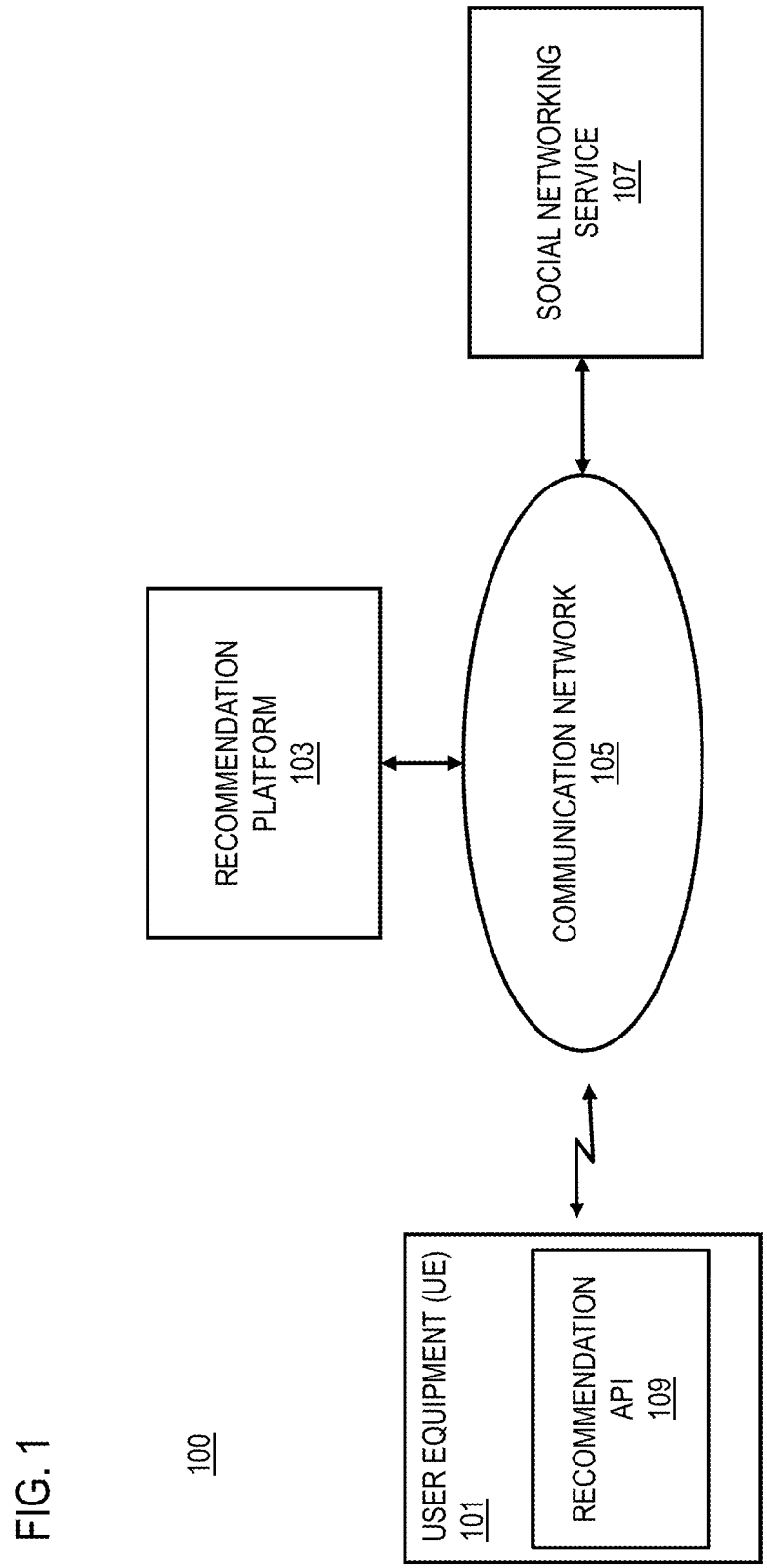
FIG. 1 is a diagram of a system capable of providing recommendation services while protecting the privacy of personal user information, according to one example embodiment.

FIG. 1 is a diagram of a system capable of providing recommendation services while protecting the privacy of personal user information, according to one embodiment. Conventional recommendation systems store a great deal of personal information on a server such as name, username, email address, telephone number, mailing address, credit card number social security number, etc. Accordingly, there is a risk that if that information is accidentally or purposefully disclosed, a person's privacy is at risk. Many would argue that just storing personal information remotely at all is a loss of privacy. While security measures may be put in place to protect the personal information, attackers may still manage to infiltrate a storage location of the personal information in order to steal the information from a server associated with a conventional recommendation service.

To address this problem, a system 100 of FIG. 1 introduces the capability to provide recommendation services while protecting the privacy of personal user information. As shown in FIG. 1, the system 100 comprises a user equipment (UE) 101 having connectivity to a recommendation platform 103 and a social networking service 107 via a communication network 105. To protect the privacy of users of the system 100, the system 100 does not store a consistent user identifier on a server like conventional recommendation systems.

According to various embodiments, user preferences may include both user information and user preference data. User information elements may include, for example, a user device model (e.g., to identify device capabilities), age, nationality, language preferences, interest areas, a user's tendencies, etc. In one embodiment, the preference data may be automatically retrieved and/or generated by the system 100 from backend data and/or external information sources. In another embodiment, the preference data may be recorded at the UE 101 upon entry of user personal data, online interactions and related activities with respect to specific topics, points of interests, or locations, etc. It is contemplated that the user can define any number of preference elements as user preference data. In addition, or alternatively, the system 100 may decide what parameters or attributes to choose to represent user context and/or preferences so as to maintain a user's anonymity when using that information to generate a recommendation.

According to one example embodiment, a user of a UE 101 sends three pieces of information (e.g., separately, together, etc.) instead of one like in a conventional recommendation system by way of a recommendation API 109. In a conventional recommendation system, each user sets preference values in a large matrix, where items are columns and users are rows. Through either active or passive input, the user tells the conventional system his preferences, which are represented numerically in the matrix in that user's row (this is the one piece of information). This information that is tied specifically to the user is usually stored on a server.

Contrarily, in the system 100, the user of a UE 101 sends the following three pieces of information to the recommendation platform 103 that has a plethora of recommendation information in matrix form: (a) a new row in its entirety, (b) an optimization row and (c) a Boolean flag signifying if the user is new or not new (in this example, (a) and (b) are also called the "current" and "previous" preferences, respectively). It is noted that, in some embodiments, the users may be represented by rows and the items may be represented by columns, or vice versa. Moreover, it is noted that, in certain embodiments, the following three pieces may include (d) a new column in its entirety or (e) an optimization column in place of, or in addition to, one or both of rows (a) and (b). As such, although various embodiments are described with respect to rows (a) and (b), it is contemplated that the approach described herein may also be used with columns (d) and (e) (e.g., in place of rows (a) or (b), in addition to rows (a) or (b), etc.).

The recommendation platform 103 receives the two rows (a) and (b) and flag (c). The recommendation platform 103 appends the new row (a) to its recommendation matrix. The recommendation platform 103 proceeds to make a recommendation for a user of UE 101 using any appropriate recommendation system algorithm for the domain (without knowing the identity of the user, and only based on the reduced summary of the user's current preferences, i.e. rows (a), (b) and flag (c)). The recommendation system algorithm may, as discussed in further detail below, use information that is stored at the recommendation platform 103 that is associated with the user and/or other users of the system 100. The other user information that is stored at the recommendation platform 103 may come from their own interaction with the recommendation platform 103, or may be mined from user profiles associated with the social networking service 107.

If (c) indicates the user is not new, the recommendation platform 103 finds an existing row which best matches new row (a) and/or optimization row (b) and/or a weighted combination of these two rows. This existing row, which is most similar to the new row, is assumed to come from a previous transaction from the same user to keep a one-to-one mapping between users and rows. The best matching existing row is then deleted from the matrix. The recommendation platform 103, in this example, knows that there is a one-to-one mapping between users and rows, but the actual mapping is not discoverable. If (c) indicates the user is new, no row is deleted from the matrix. The recommendation platform 103 then sends a generated recommendation, based on the information in the matrix, back to the recommendation API 109 for provision to the user by way of UE 101. The generated recommendation is also a row in the matrix where each item has a certain level (probability) of preference.

Throughout usage of the system 100, a user's tendencies may be recorded. For instance, the Boolean flag may be replaced with other, more detailed information such as the first item a user expressed interest in. In the case of a location recommendation system, it could be the first place that a user ever visited with the UE 101.

The three pieces of user input (a), (b) and (c) are stored and used to improve the recommendation system offline. Specifically, the new row (a) and the optimization row (b) are used to improve the system as follows. The new row (a) is called the "current preferences" and the optimization row (b) is called "previous preferences." In general, the rows (a) and (b) are taken from preferences the user has shown during two distinct periods of time. Just as the new row (a) was applied to the matrix to generate a recommendation, the optimization row (b) is applied to a copy of the matrix to generate a recommendation. This recommendation should look like the new row (a). If it does not, the recommendation platform 103 is not performing well and needs to be further trained.

In this way, the parameters for making recommendations can be tuned by comparing (a) and (b). Row (a) provides a ground truth for what should have been recommended given (b). If the recommendation platform 103 recommends row (a) given row (b) for a large fraction of transactions (which may come from many different users associated with the social networking service 107, for example, or just the recommendation platform 103 based on a linking with the recommendation API 109), then the recommendation platform 103 may be considered to be performing well. After rows (a) and (b) have been used to improve the recommender, they can be deleted from the recommendation platform 103, or they can be used in later optimizations.

According to various embodiments, the system 100 may apply to recommending music, books, movies, places to go, restaurants, school, things to buy, things to see, sporting events to try, etc. The recommendation platform 103 can also be combined with other profile (demographic) information such as that the user is male, age 30-35, or activities that a user is doing when the matrix is enhanced, or the user's location, for example. This information can be included up to the point where it would too severely narrow the set of possible users should the server's database be publicly revealed so that the user's privacy is preserved. Then, in a case of a music recommendation service, for example, the recommendations could include songs listened to while doing various activities, like running, working, or cooking, as well as being based on demographic information so that an appropriate genre (or set of songs) is recommended.

In one or more embodiments, to prevent attacks on the recommendation platform 103 such as continually sending garbage from the UE 101 to the recommendation platform 103, the recommendation platform 103 could send checksums or nonces that would limit the update frequency of any given recommendation API 109.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, recommendation platform 103 and social networking service 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
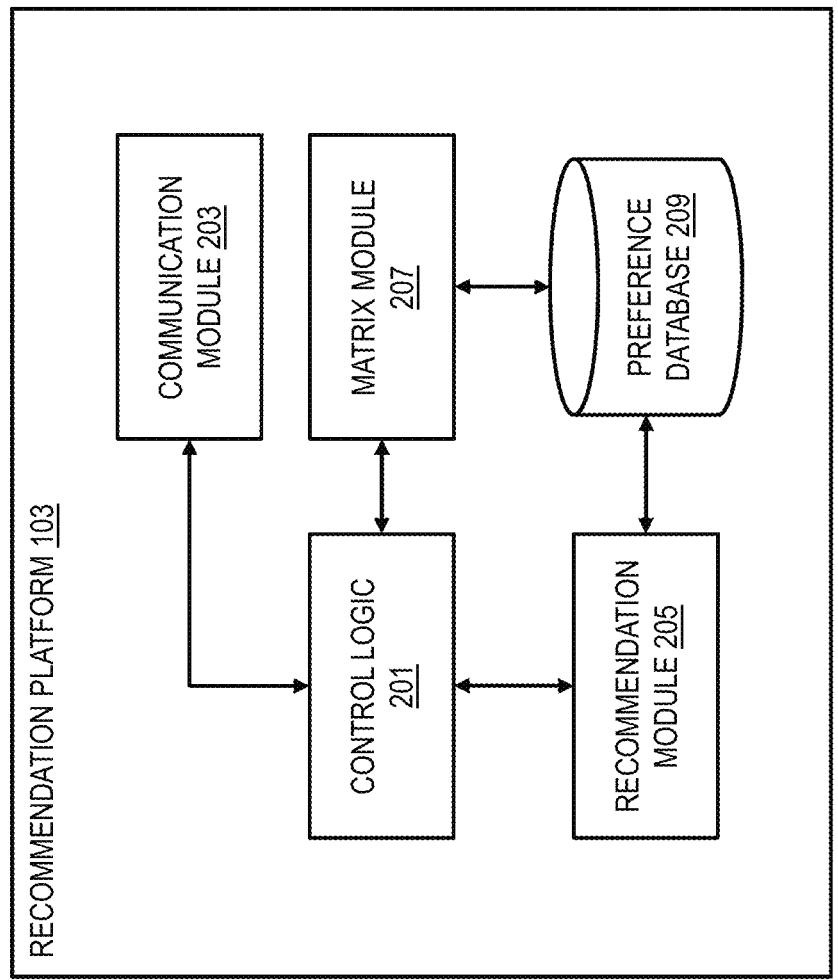
FIG. 2 is a diagram of the components of a recommendation platform, according to one example embodiment.

FIG. 2 is a diagram of the components of the recommendation platform 103, according to one embodiment. By way of example, the recommendation platform 103 includes one or more components for providing recommendation services while protecting the privacy of personal user information. It is contemplated that the functions of these components may be combined in one or more components or performed by other components of equivalent functionality. In this embodiment, the recommendation platform 103 includes a control logic 201, a communication module 203, a recommendation module 205, a matrix module 207 and a preference database 209.

The recommendation platform 103 receives a recommendation request from the UE 101 by way of the communication module 203. Upon receipt of the recommendation request, the communication module communicates with the recommendation module 205 by way of the control logic 201. The control logic 201 instructs the recommendation module to extract preference information from the preference database 209 and, with the matrix module, compile a recommendation matrix that is based on new and/old preference information.

According to one example embodiment, a user of a UE 101 sends a recommendation request to the recommendation platform 103. The request comprises three pieces of information, as discussed above. The information is processed and compared to recommendation information that may already be present in the preference database. The information that is received by the communication module 203 may be converted to matrix form such as: (a) a new row in its entirety, (b) an optimization row and (c) a Boolean flag signifying if the user is new or not new (in this example, (a) and (b) are also called the "current" and "previous" preferences, respectively).

The recommendation platform 103 receives, by way of the communication module 203, the two rows (a) and (b) and flag (c). The control logic 201 appends the new row (a) to its recommendation matrix by instructing the matrix module 207 to perform this task. The recommendation module 205 generates a recommendation for a user of UE 101 using any appropriate recommendation system algorithm for the domain (without knowing the identity of the user, and only based on the reduced summary of the user's current preferences, i.e. rows (a), (b) and flag (c)).

Then, if (c) indicates that the user is not new, the recommendation module 205, in conjunction with the matrix module 207 and the preference database 209 will search for an existing row that best matches new row (a) and/or optimization row (b) and/or a weighted combination of these two rows. This existing row, which is most similar to the new row, comes from a previous transaction stored in the preference database 209 from the same user to keep a one-to-one mapping between users and rows. The best matching existing row is then deleted from the matrix by the matrix module 207. The recommendation module 205, in this example, knows that there is a one-to-one mapping between users and rows, but the actual mapping is not discoverable. If (c) indicates the user is new, no row is deleted from the matrix by the matrix module 207. The recommendation module 205 then sends a generated recommendation, based on the information in the matrix, back to the recommendation API 109 by way of the communication module 203 for provision to the user of UE 101. The generated recommendation is also a row in the matrix where each item has a certain level (probability) of preference. For example, a likelihood of a user acting on a recommendation may be based on historical actions with regard to similar recommendation. The historical actions being stored in the preference database 209 for further analysis and application as the recommendation module 205 optimizes its performance over time. In addition, since the recommendation matrix may be based on anonymized information (e.g., anonymized user preference records) associated with many users, it may, for instance, provide relevant recommendations according to the demographic or location information of those users. As a result, the recommendation matrix may remain relevant (or more accurate) for longer periods, as compared with individual user identifiable information, for generating recommendations. Consequently, the recommendation matrix may be retained for longer periods than the identifiable information of individual users.

Throughout usage of the recommendation platform 103, a user's tendencies may be recorded. For instance, the Boolean flag may be replaced with other, more detailed information such as the first item a user expressed interest in. In the case of a location recommendation system, it could be the first place that a user ever visited with the UE 101.

The three pieces of user input (a), (b) and (c) are stored in the preference database 209 and used to improve the performance of the recommendation module 205 offline. Specifically, the new row (a) and the optimization row (b) are used to improve the system as follows. The new row (a) is called the "current preferences" and the optimization row (b) is called "previous preferences." In general, the rows (a) and (b) are taken from preferences the user has shown during two distinct periods of time. Just as the new row (a) was applied to the matrix to generate a recommendation, the optimization row (b) is applied to a copy of the matrix to generate a recommendation. This recommendation should look like the new row (a). If it does not, the recommendation platform 103 is not performing well and needs to be further trained. The control logic 201 conducts the performance analysis on a default or user preferred schedule.

As discussed above, the parameters for making recommendations can be tuned by comparing (a) and (b). Row (a) provides a ground truth for what should have been recommended given (b). If the recommendation module 205 recommends row (a) given row (b) for a large fraction of transactions (which may come from many different users associated with the social networking service 107, for example, or just the recommendation platform 103 based on a linking with the recommendation API 109), then the recommendation platform 103 may be considered to be performing well. After rows (a) and (b) have been used to improve the recommender, the control logic 201 may instruct the matrix module 207 to purge the rows (a) and (b) from the preference database 209, or the rows (a) and (b) may be stored in the preference database 209 for use in later optimizations. The control logic 201 may decided to store or purge the rows (a) and (b) based on detected recommendation performance and/or user preference change tendencies, for example.

Figure 3:
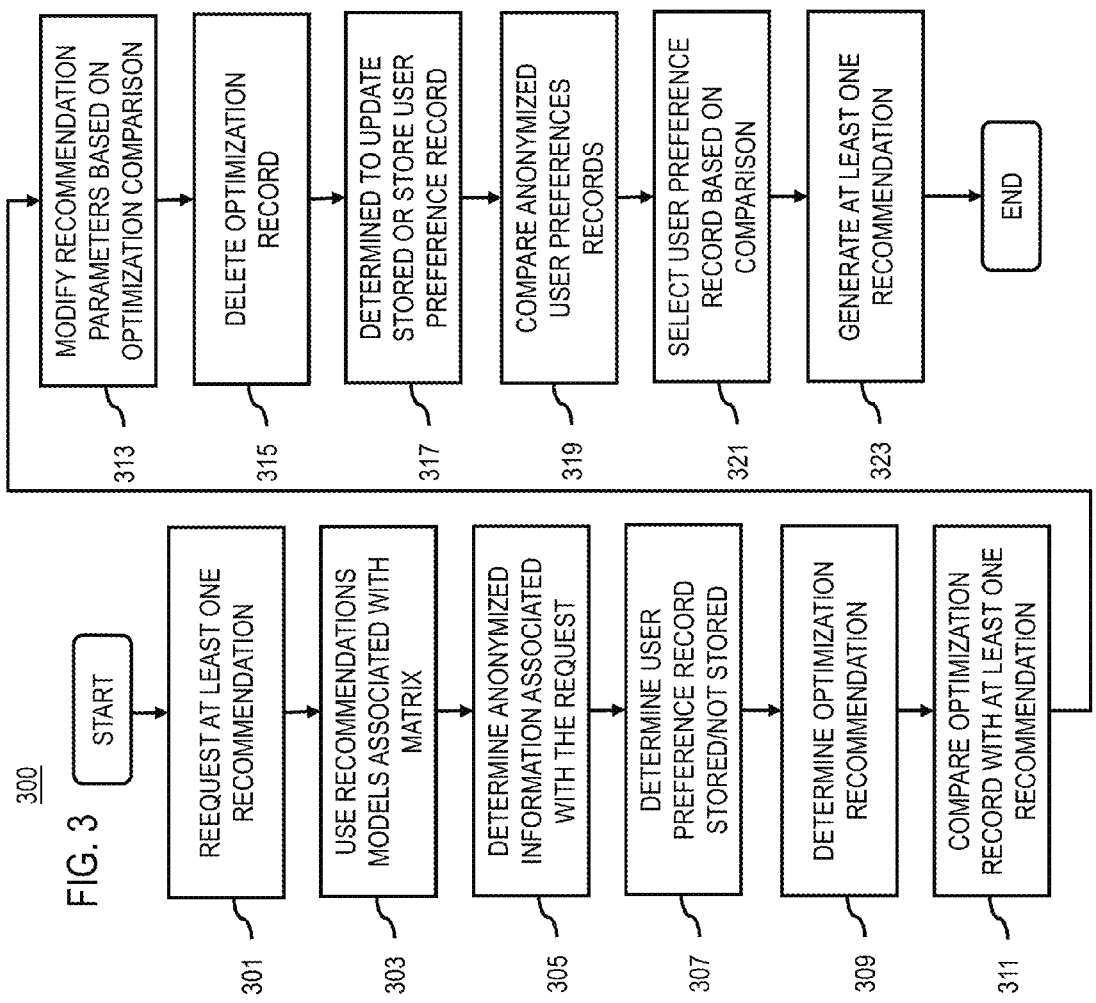
FIG. 3 is a flowchart of a process for providing recommendation services while protecting the privacy of personal user information, according to one example embodiment.
Figure 11:
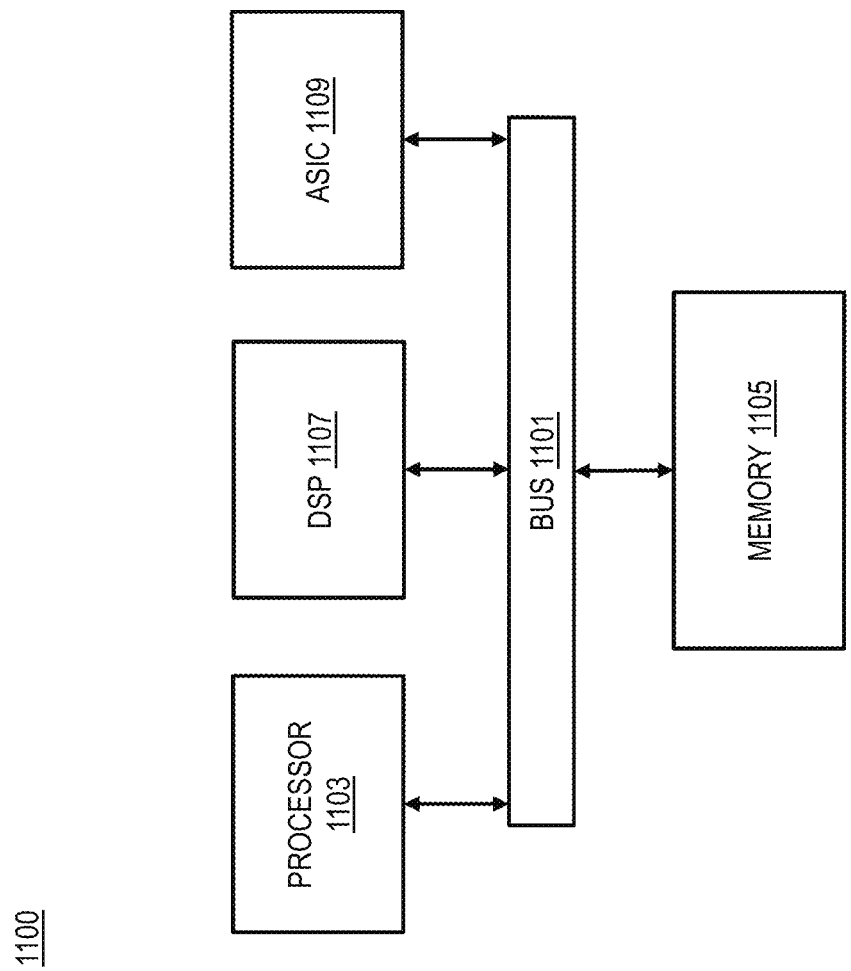
FIG. 11 is a diagram of a chip set that can be used to implement an embodiment of the invention.

FIG. 3 is a flowchart of a process for providing recommendation services while protecting the privacy of personal user information, according to one embodiment. In one embodiment, the recommendation platform 103 performs the process 300 and is implemented in, for instance, a chip set including a processor and a memory as shown in FIG. 11. In step 301, the recommendation platform 103 processes a request for at least one recommendation, the request specifying at least in part an anonymized user preference record. The request may further specify, at least in part, an optimization user preference record. Further, the optimization user preference record may also include user preference information associated with a first temporal period that is different from a second temporal period associated with the anonymized user preference record. For example, the rows (a) and (b), distinguishable as "current" and "previous" preference records may be drawn from non-overlapping periods of time of similar duration such as a week. The current preference record being a record that is more recent than a previous record.

Then, in step 303, the recommendation platform 103 determines to generate the at least one recommendation by using one or more recommendations models associated with a recommendation matrix consisting, at least in part, of the anonymized user preference record, the one or more previously stored anonymized user preference records, or a combination thereof.

The process continues to step 305 in which the recommendation platform 103 determines anonymized profile information associated with the request, the anonymized user preference record, or a combination thereof. The at least one recommendation is based, at least in part, on the anonymized profile information. Next, in step 307, the recommendation platform 103 determines whether the anonymized user preference record was previously stored. The determination that the anonymized user preference record is not previously stored is based, at least in part, on a status flag provided in the request, the comparison, or a combination thereof. Then, in step 309, the recommendation platform 103 processes and/or facilitates a processing of the optimization user preference record to determine at least one optimization recommendation.

The process continues to step 311 in which the recommendation platform 103 compares the at least one optimization recommendation against at least one recommendation generated by the recommendation platform 103. Then, in step 313, the recommendation platform 103 modifies one or more recommendation parameters based, at least in part, on the comparison between the optimization recommendation and the at least one generated recommendation. Next, in step 315, the recommendation platform determines whether to delete the optimization user preference record after the comparison between the optimization recommendation and the at least one generated recommendation. The process continues to step 317 in which the recommendation platform 103 updates at least one of the one or more previously stored user preference records to the anonymized user preference record based, at least in part, on the comparison. The recommendation platform 103 may also, in step 317, determine to store the anonymized user preference record if the recommendation platform 103 determines that the anonymized user preference record is not stored in step 307.

Then, in step 319, the recommendation platform 103 compares the anonymized user preference record against one or more previously stored anonymized user preference records. Next, in step 321, the recommendation platform 103 selects the anonymized user preference record, the one or more previously stored anonymized user preference records, or a combination thereof based, at least in part, on the comparison. The process continues to step 323 in which the recommendation platform 103 generates the at least one recommendation based, at least in part, on the selection. The one or more recommendations models include, at least in part, a collaborative filtering recommendation model. As discussed above, the collaborative filtering recommendation model may apply to recommending music, books, movies, places to go, restaurants, school, things to buy, things to see, sporting events to try, etc. The recommendation platform 103, using the recommendations models can also consider other profile (demographic) information such as that the user is male (gender identification), age 30-35, or activities that a user is doing when the matrix is enhances, or the user's location, for example.

FIG. 4 illustrates an example recording of a user's actual preferences 401 on a UE 101. In this example, preferences 401 are related to a user's listening to a various songs on a particular day, and how many times the user listened to that song on that day. The preferences 401 may be passively or actively collected by way of any type of sensor, GPS module, sound recorder, usage monitor, etc. The preferences 401 may be a trace of the user's behavior or a lossy (condensed) summary. FIG. 4 illustrates the preferences 401 as a lossy summary (The system 100 does not know the time of day when the user played the song, only which day). As more preferences are collected and stored in the preference database 209, old entries can be deleted when they are no longer useful as determined by the recommendation platform 103, or by the user, for example. In this example, entries are based on the day a song was listened to, but the usage preferences 401 may be based on any number of variables such as the song itself, or time of day, etc. to achieve any level of granularity or perspective.

Figure 5:
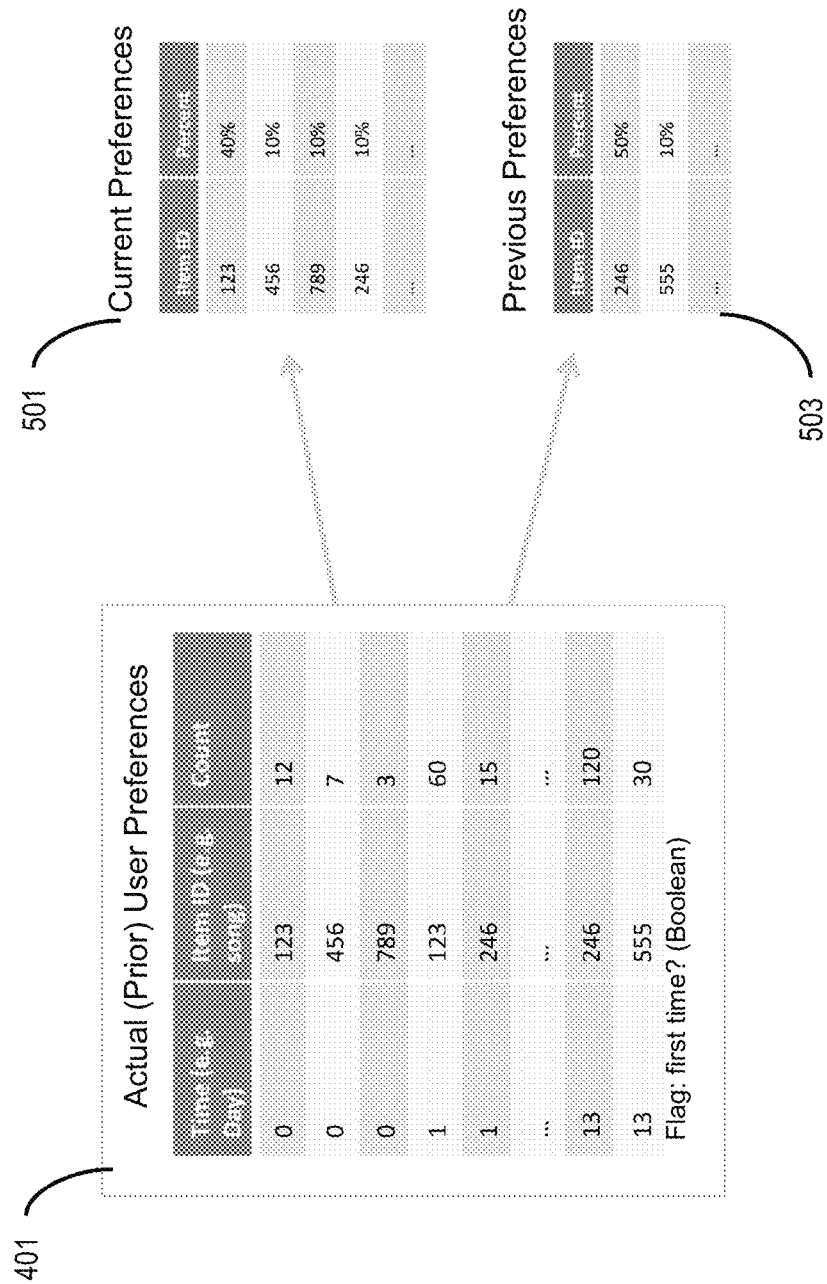
FIG. 5 is a diagram of a process illustrating a splitting of the user preference table into current and previous preferences, according to one example embodiment.

FIG. 5 illustrates an update of the preferences 401 discussed above in FIG. 4. During the update, the actual preferences 401 are split into two sets of preferences, current preferences 501 and previous preferences 503, by the recommendation platform 103. The current preferences 501 and previous preferences 503 are drawn from non-overlapping periods of time of roughly equivalent duration (e.g. a week each). The current preferences 501 are more recent than the previous preferences 503, which may immediately precede the current preferences 501. As shown, the current preferences 501 may, for instance, indicate that, for a particular demographic, location, or recommendation service, 40% of users prefer item "123," 10% of users prefer item "456," 10% of users prefer item "789," 10% of users prefer item "246," etc. The previous preferences 503 may indicate that, for the particular demographic, location, or recommendation service, 50% of users previously preferred item "246," 10% of users previously preferred item "555," etc.

Figure 6:
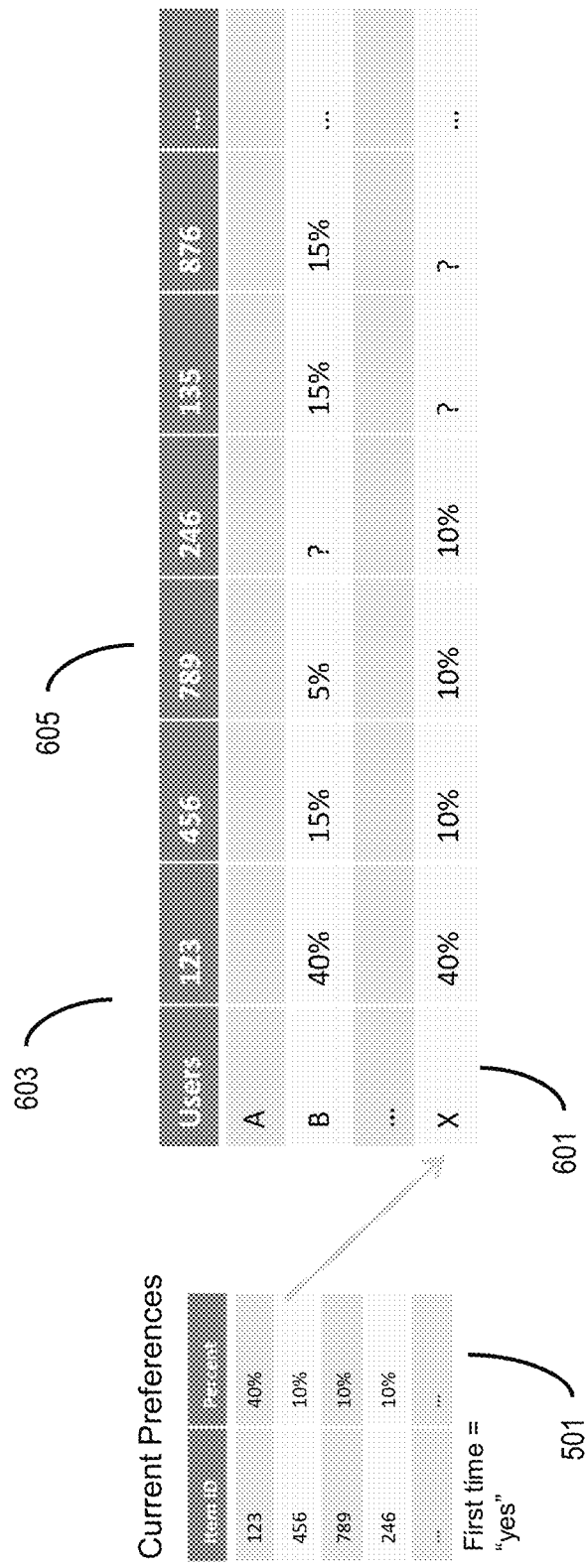
FIG. 6 is a diagram of a process illustrating the addition of current preferences to a recommendation matrix, according to one example embodiment.

FIG. 6 illustrates the addition of the current preferences 501 discussed above in FIG. 5 as a new row 601 to the recommendation matrix 603 by the recommendation platform 103. The recommendation matrix 603 illustrates multiple users, A and B, for example, and their preferences for corresponding item ID numbers 605. The recommendation platform 103 does not record a user ID in the recommendation matrix 603, or even get that information from the UE 101 at all. Rather, it merely adds the user preference record as row 601 anonymously.

Figure 7:
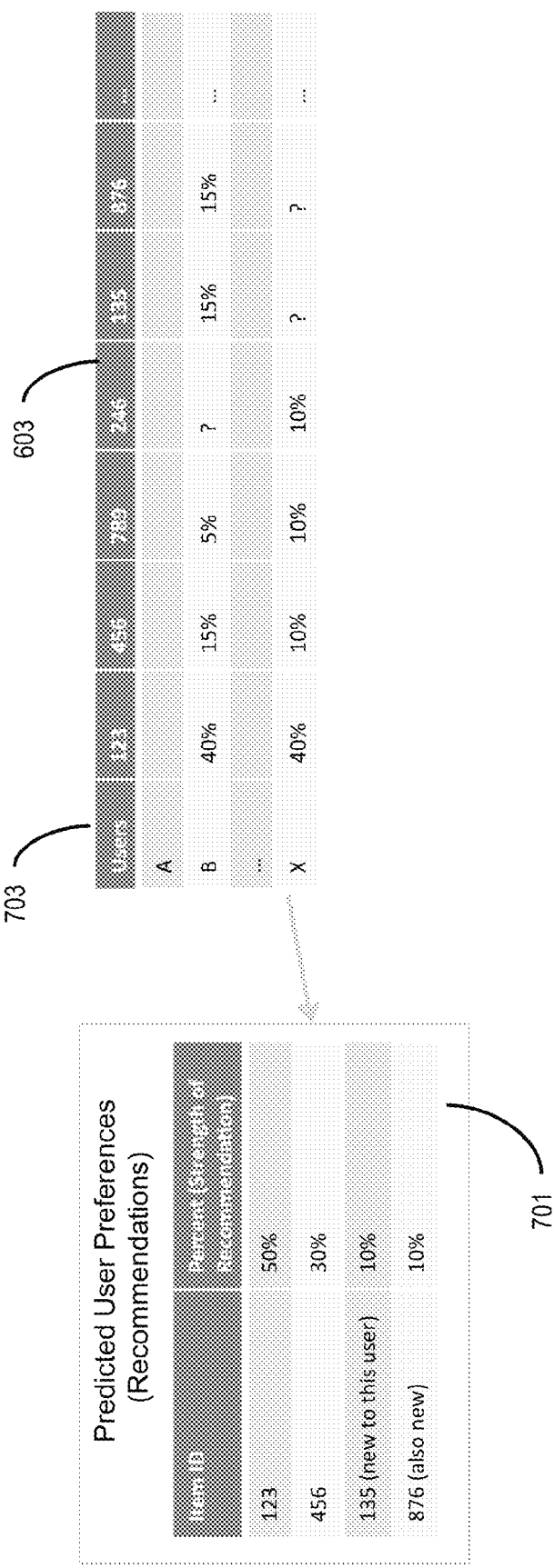
FIG. 7 is a diagram of a process illustrating the provision of a recommendation, according to one example embodiment.

FIG. 7 illustrates the formulation of a recommendation 701 by the recommendation platform 103 based on similarities of preferences to the various item ID's 605 discussed above to other users A and B in the recommendation matrix 603 discussed above in FIG. 6. The recommendation platform 103 sends the recommendation 701 as a response to the recommendation request received from the UE 101. This sending of the recommendation may complete the recommendation request. However, the user, by way of the recommendation API 109 may indicate that the request be ongoing such that the recommendations may continually flow to the UE 101 for the user to receive.

Figure 8:
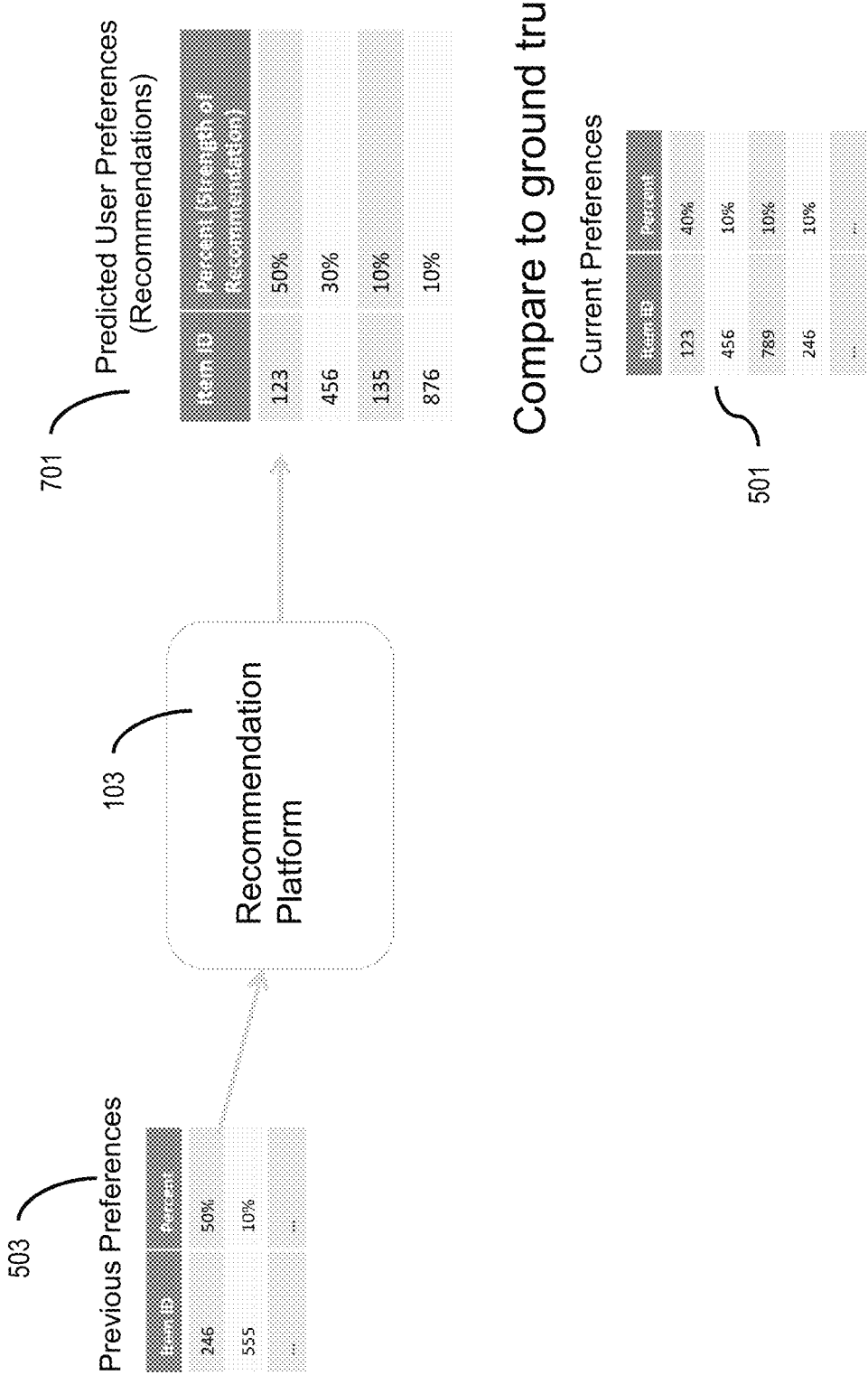
FIG. 8 is a diagram of a process illustrating a performance analysis of the recommendation platform, according to one example embodiment.

FIG. 8 presents an evaluation and improvement of the recommendation platform 103 using the current preferences 501 and previous preferences 503 discussed above with respect to FIG. 5. The results of the prediction, i.e. the recommendation 701 discussed above, are compared to what the user actually did, i.e. the current preference 501, even though we do not know the identity of the user. Based on this comparison, the recommendation platform 103 can adjust its recommendations to better conform to the continually changing preferences of one or more users.

Figure 9:
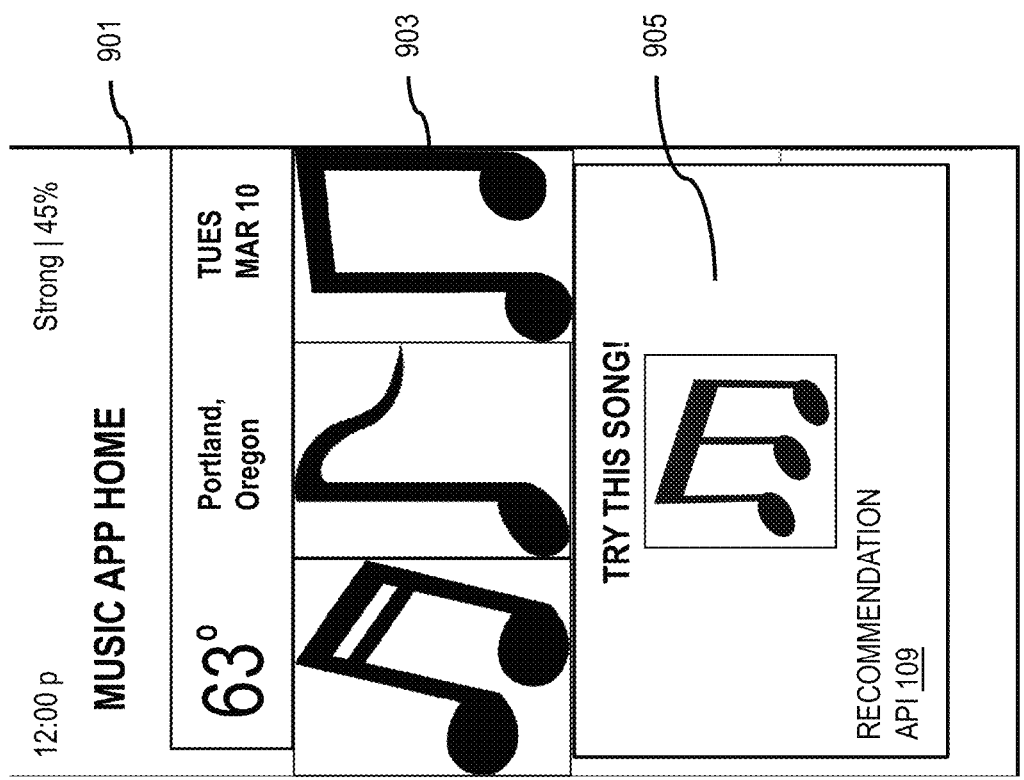
FIG. 9 is a diagram of a user interface utilized in the processes of FIG. 3, according to one example embodiment.

FIG. 9 illustrates an example user interface diagram of an application 901 that interfaces with the recommendation API 109 and recommendation platform 103 as utilized in the processes of FIG. 3, according to various embodiments. In this example, the application 901 is a music application, but the application may be anything related to shopping, dining, location-based services like a navigation system or augmented reality view, reading, video playback, etc. The application 901, in this example, has a playlist 903 that shows a banner-type display of songs that may be selected, have been played, or are currently playing, depending on various user interface preferences. For example, a song to the left may be a song that has played already, and the song to the far right in the playlist 903 may be currently playing. Or, the order may be manipulated such that the song in the middle is currently playing and the song to the right is next. Any order of playlist may be desirable. The recommendation API 109 provides a recommendation 905 that suggests a song to a user based on the recommendation process discussed above in FIG. 3 as produced by the recommendation platform 103. The recommendation API 109 may also be integrated into the playlist 903 such that the recommended song could simply appear as a current song or a next song, for example, that the user may select or choose to disregard, or advance to a next song in his own playlist or suggestion from the recommendation platform 103. It is noted that, in some embodiments, a history of songs played, recommended, etc., may be stored by the application 901 (or a browser with which the application 901 is integrated, another related application, etc.), for instance, at a client device associated with the application 901. Additionally, or alternatively, song recommendations provided by the application 901 (or an associated service) may be anonymized along with demographic information associated with the client device, a user of the client device, etc. Subsequently, the anonymized recommendations and the anonymized demographic information may be made available to a third party (e.g., an advertiser, other service providers, etc.) for use in other applications, advertisements, other services, etc., associated with the third party.

Similarly, the recommendation API 109 may be applied to any other information that may be of interest to a user. For example, if the application 901 is a restaurant application, the playlist 903 may display a series of restaurants a user may have previously attended, or suggestions to a user such that the user may decide to make a reservation, or try the restaurant. The recommendation API 109 with the recommendation platform 103, as discussed above, may consider any of the user's anonymous tendencies, as well as location information and/or demographic information, etc., for example, when suggesting a restaurant. Further, the recommendation API 109 may allow for any suggestion related to any type of application 901 that the user is running on the UE 101, or the recommendation may be independent of the application 901 such that as the user is listening to music, the recommendation API 109 will consider the area the user is in, and suggest that the user go shopping at a particular store, for example.

The processes described herein for providing recommendation services while protecting the privacy of personal user information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
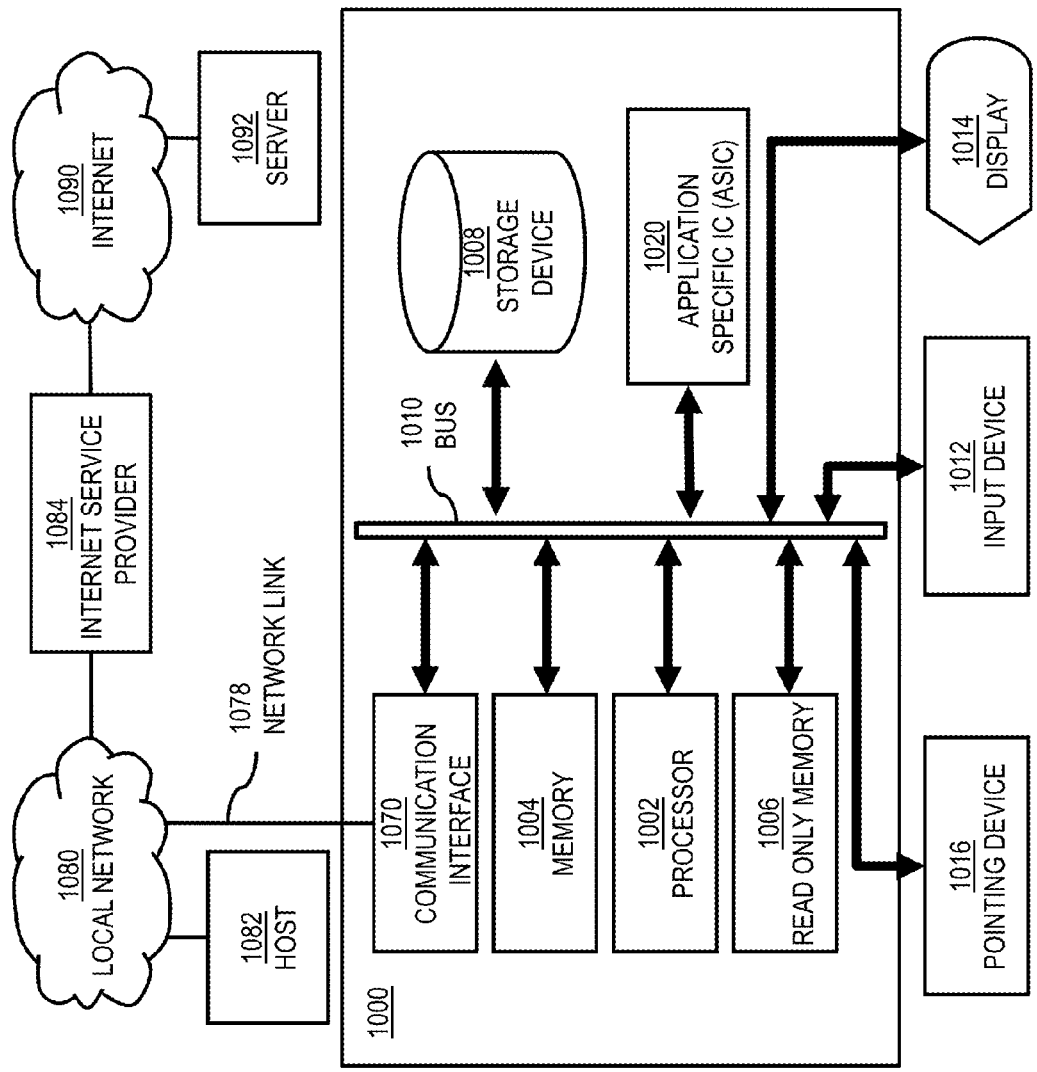
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide recommendation services while protecting the privacy of personal user information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing recommendation services while protecting the privacy of personal user information.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to provide recommendation services while protecting the privacy of personal user information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing recommendation services while protecting the privacy of personal user information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing recommendation services while protecting the privacy of personal user information, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing recommendation services while protecting the privacy of personal user information to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide recommendation services while protecting the privacy of personal user information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing recommendation services while protecting the privacy of personal user information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to providing recommendation services while protecting the privacy of personal user information. The memory 1105 also stores the data associated with or generated by the execution of the inventive steps.

Figure 12:
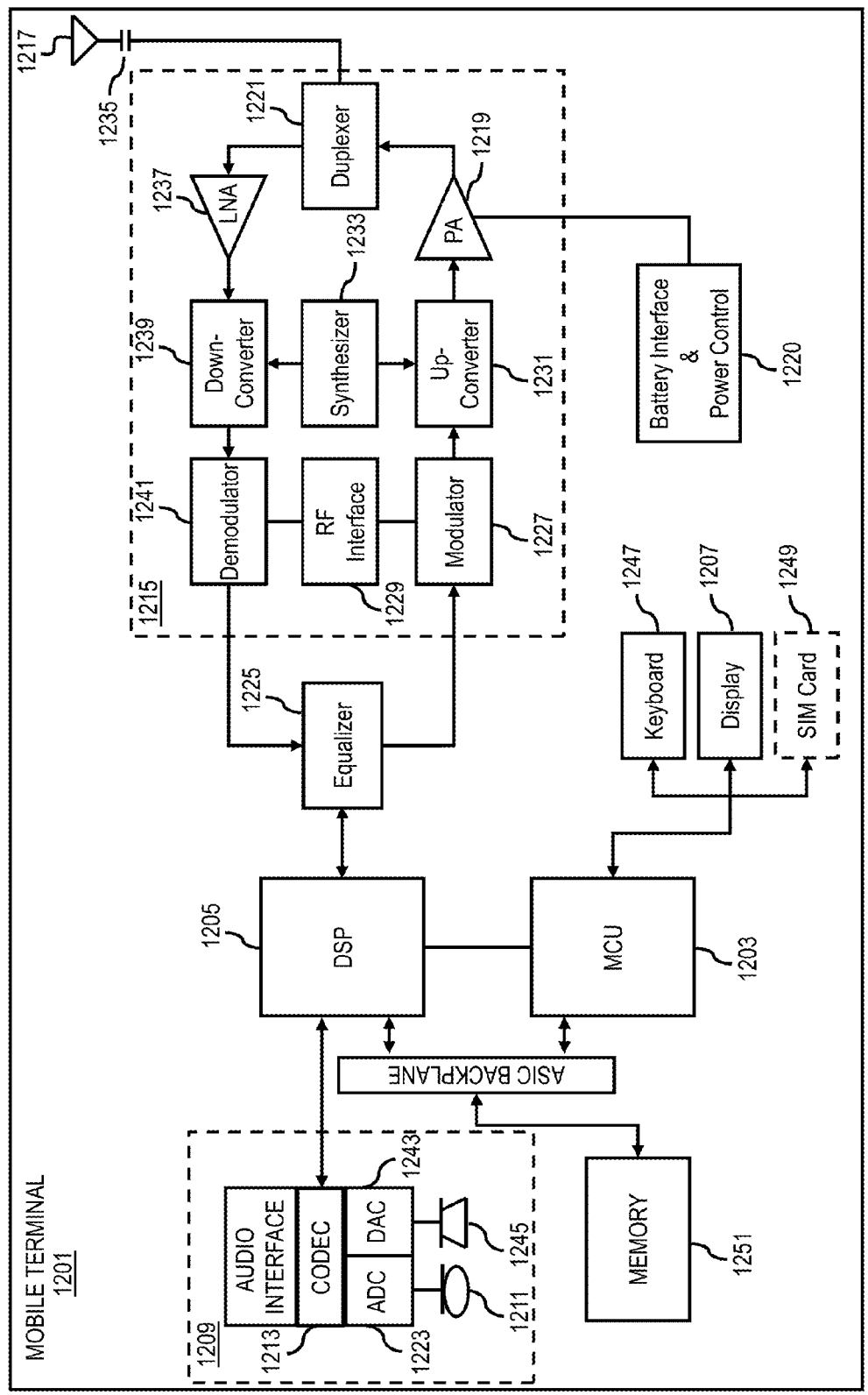
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing recommendation services while protecting the privacy of personal user information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing recommendation services while protecting the privacy of personal user information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide recommendation services while protecting the privacy of personal user information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a request for at least one recommendation, the request specifying at least in part an anonymized user preference record;
   at least one determination that the anonymized user preference record is not previously stored;
   a storage of the anonymized user preference record;
   a comparison of the anonymized user preference record against one or more previously stored anonymized user preference records;
   a selection of the anonymized user preference record, the one or more previously stored anonymized user preference records, or a combination thereof based, at least in part, on the comparison; and
   at least one determination to generate the at least one recommendation based, at least in part, on the selection.

2. A method of claim 1, wherein the (1) data and/or (2) information and/or (3) at least one signal are further based, at least in part, on the following:
   at least one determination to generate the at least one recommendation by using one or more recommendations models associated with a recommendation matrix consisting, at least in part, of the anonymized user preference record, the one or more previously stored anonymized user preference records, or a combination thereof.

3. A method of claim 2, wherein the one or more recommendations models include, at least in part, a collaborative filtering recommendation model.

4. A method of claim 1, wherein the determination that the anonymized user preference record is not previously stored is based, at least in part, on a status flag provided in the request, the comparison, or a combination thereof.

5. A method of claim 1, wherein the request further specifies, at least in part, an optimization user preference record, and wherein the optimization user preference record includes user preference information associated with a first temporal period that is different from a second temporal period associated with the anonymized user preference record.

6. A method of claim 5, wherein the (1) data and/or (2) information and/or (3) at least one signal are further based, at least in part, on the following:
   a processing of the optimization user preference record to determine at least one optimization recommendation; and
   another comparison of the at least one optimization recommendation against the at least one recommendation.

7. A method of claim 6, wherein the (1) data and/or (2) information and/or (3) at least one signal are further based, at least in part, on the following:
   a modification of one or more recommendation parameters based, at least in part, on the another comparison.

8. A method of claim 6, wherein the (1) data and/or (2) information and/or (3) at least one signal are further based, at least in part, on the following:
   causing, at least in part, a deletion of the optimization user preference record after the another comparison.

9. A method of claim 1, further comprising:
   anonymized profile information associated with the request, the anonymized user preference record, or a combination thereof,
   wherein the at least one recommendation is further based, at least in part, on the anonymized profile information.

10. A method of claim 1, further comprising:
    an update of at least one of the one or more previously stored user preference records to the anonymized user preference record based, at least in part, on the comparison.

11. An apparatus comprising:
    at least one processor; and
    at least one memory including computer program code for one or more programs,
    the at least one memory and the computer program code configured to, with the at least one processor, cause the apparatus to perform at least the following,
    determine a request for at least one recommendation, the request specifying at least in part an anonymized user preference record;
    determine that the anonymized user preference record is not previously stored;

cause, at least in part, a storage of the anonymized user preference record;

cause, at least in part, a comparison of the anonymized user preference record against one or more previously stored anonymized user preference records;

cause, at least in part, a selection of the anonymized user preference record, the one or more previously stored anonymized user preference records, or a combination thereof based, at least in part, on the comparison; and determine to generate the at least one recommendation based, at least in part, on the selection.

12. An apparatus of claim 11, wherein the apparatus is further caused to:

determine to generate the at least one recommendation by using one or more recommendations models associated with a recommendation matrix consisting, at least in part, of the anonymized user preference record, the one or more previously stored anonymized user preference records, or a combination thereof.

13. An apparatus of claim 12, wherein the one or more recommendations models include, at least in part, a collaborative filtering recommendation model.

14. An apparatus of claim 11, wherein the determination that the anonymized user preference record is not previously stored is based, at least in part, on a status flag provided in the request, the comparison, or a combination thereof.

15. An apparatus of claim 11, wherein the request further specifies, at least in part, an optimization user preference record, and wherein the optimization user preference record includes user preference information associated with a first temporal period that is different from a second temporal period associated with the anonymized user preference record.

16. An apparatus of claim 15, wherein the apparatus is further caused to:

process and/or facilitate a processing of the optimization user preference record to determine at least one optimization recommendation; and cause, at least in part, another comparison of the at least one optimization recommendation against the at least one recommendation.

17. An apparatus of claim 16, wherein the apparatus is further caused to:

cause, at least in part, a modification of one or more recommendation parameters based, at least in part, on the another comparison.

18. An apparatus of claim 16, wherein the apparatus is further caused to:

cause, at least in part, a deletion of the optimization user preference record after the another comparison.

* * * * *